United States Patent [19]
Goebels

[11] Patent Number: 5,462,342
[45] Date of Patent: Oct. 31, 1995

[54] ELECTRONIC BRAKE SYSTEM FOR SEPARATELY CONTROLLING NONDRIVEN FRONT WHEELS AND DRIVEN REAR WHEELS

[75] Inventor: Hermann Goebels, Schwieberdingen, Germany

[73] Assignee: Robert Bosch GmbH, Stuttgart, Germany

[21] Appl. No.: 106,956

[22] Filed: Aug. 17, 1993

[30] Foreign Application Priority Data

Aug. 17, 1992 [DE] Germany ............ 42 27 083.9

[51] Int. Cl.$^6$ .......................... B60T 8/60; B60T 13/66; B60T 17/00
[52] U.S. Cl. .............. 303/113.2; 303/3; 303/118.1; 303/186
[58] Field of Search .............. 303/3, 7, 15, 10, 303/9.62, 100, 110, 118.1, 108, 113.2

[56] References Cited

U.S. PATENT DOCUMENTS

| | | | |
|---|---|---|---|
| 4,671,577 | 6/1987 | Woods | 303/3 |
| 4,850,650 | 7/1989 | Eckert et al. | 303/9.62 |
| 5,129,712 | 7/1992 | Feldmann et al. | 303/3 |
| 5,184,875 | 2/1993 | Wrede | 303/3 |
| 5,217,280 | 6/1993 | Nykerk et al. | 303/3 |

FOREIGN PATENT DOCUMENTS 0467112 1/1992 European Pat. Off. .

Primary Examiner—Matthew C. Graham
Attorney, Agent, or Firm—Edwin E. Greigg; Ronald E. Greigg

[57] ABSTRACT

The invention relates to an electronic brake system, especially for road vehicles. According to the invention, the entire electronic system is split into only two units, which communicate with one another and each of which can control at least two pressures independently of one another. The brake system may be operated pneumatically, or electronically/pneumatically.

10 Claims, 1 Drawing Sheet

ELECTRONIC BRAKE SYSTEM FOR SEPARATELY CONTROLLING NONDRIVEN FRONT WHEELS AND DRIVEN REAR WHEELS

BACKGROUND OF THE INVENTION

The invention is based on an electronic brake system as described hereinafter.

One such electronic brake system is known from European Patent Application EP-A 0 467 112. In the known system, the electronics are divided into two units, each forming a central module with a microprocessor; each central module serves to control two wheel modules, which include an electrical or electronic part each with one further microprocessor, and valve devices triggered thereby. One rpm sensor is assigned to each wheel module, and its output signals are evaluated by the applicable microprocessor in order to regulate the pressure at the brake cylinder of the applicable wheel in such a way that the desired brake force is achieved at every moment.

It is a disadvantage of this known electronic brake system that because the electronics are split up into two central modules communicating with one another, each having one microprocessor and with the additional microprocessors required for each of the wheel modules, the overall electronic system becomes quite expensive, and moreover a large number of connecting lines must be provided, which involves additional expense and, like the great number of electronic components, contributes to an increased likelihood of malfunction on the part of the entire electronic brake system.

OBJECT AND SUMMARY OF THE INVENTION

Based on the prior art and the problems discussed above, the object of the invention is to improve known electronic brake systems in such a way that the number of electronic component groups and of connecting lines required is reduced, while providing great flexibility in terms of possible uses.

This object is attained in the context of an ordinary electronic brake system in such a manner that as a result, compared with the prior art, the advantage is achieved that the electronics overall include only two units each containing one microprocessor; this considerably lowers the cost for the entire brake system and moreover makes it possible to reduce the number of electrical connecting lines to a minimum.

The invention will be better understood and further objects and advantages thereof will become more apparent from the ensuing detailed description of preferred embodiments taken in conjunction with the drawings.

DESCRIPTION OF THE PREFERRED EMBODIMENTS

Figure 1:
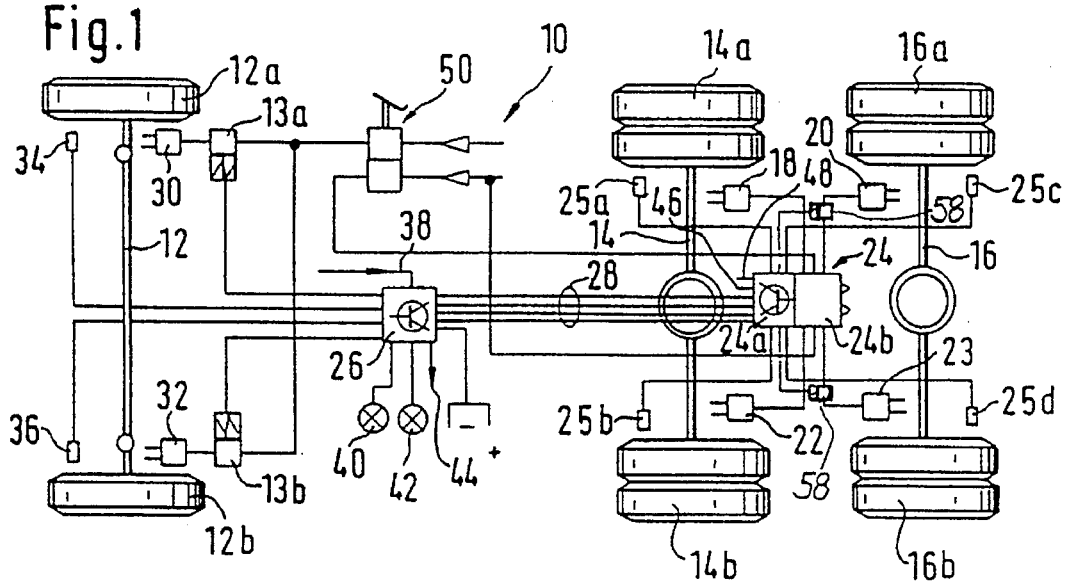
FIG. 1 is a schematic illustration of a preferred embodiment of an electronic brake system according to the invention for a 6×4 vehicle.

Individually, FIG. 1 schematically shows the wheel disposition of a vehicle 10 having a nondriven front axle 12 with two wheels 12a, 12b. The vehicle also has two driven rear axles 14, 16, each of which drives two double wheels 14a, 14b and 16a, 16b, respectively. One brake cylinder 18, 20, 22, 23 is assigned to each of the twin wheels 14a, 14b; 16a, 16b.

In this exemplary embodiment of an electronic brake system according to the invention, regulation of the pressure is done in pairs for the brake cylinders 18, 20 on the one hand and 22, 23 on the other, with the aid of a two-channel pressure regulating module 24.

This pressure regulating module 24, which has also been described in more detail in a German Patent Application No. P227084.7, filed Aug. 17, 1992, entitled "Pressure-regulating Module for a Brake System, in Particular for Utility Vehicles", includes an electronic unit 24a having at least one microprocessor and a valve unit 24b with two operating connections subjected to a separate pressure regulation, which in the exemplary embodiment are each connected to two output lines that impose a regulated operating or brake pressure upon the pairs of brake cylinders 18, 20 on the one hand and 22, 23 on the other.

The electronic unit 24a of the two-channel pressure regulating module 24, in the electronic brake system of the present exemplary embodiment, forms one unit of the electronics that are subdivided into two units. The other or second unit of the subdivided electronics is, in the exemplary embodiment, a separate electronic unit 26, which communicates with the pressure regulating module 24 or with the electronic unit 24a thereof via at least one interface 28 and is also supplied with voltage thereby.

As explained above, the pressure regulating module 24, to which rpm sensors 25a, 25b, 25c, 25d, assigned to the wheels 14a, 14b; 16a, 16b are connected, monitors up to four vehicle wheels or brake cylinders with respect to the operating pressure effective at them directly, with two channels; but in this exemplary embodiment, only the two wheels 12a, 12b of the front axle 12, with their associated brake cylinders 30, 32 and rpm sensors 34, 36 and conventional pressure control valves or pressure modulators 13a, 13b, are connected to the separate electronic unit 26.

The further separate electronic unit 26 has in addition to the interface 28 at least one further interface 38, by way of which information and control commands for controlling the engine performance and/or other electronic vehicle systems can preferably be exchanged. Also, beginning at the separate electronic unit 26, information for a driver of the vehicle equipped with the brake system can be transmitted selectively either directly or via an interface to corresponding indicator or display units, such as an ABS (anti-skid brake system) warning indicator 40, an ASR (traction control) indicator 42, or a diagnostic display unit 44.

Preferably the separate electronic unit 26, in its essential elements such as the voltage supply, the signal preparation, the microprocessor used, the output circuits, and optionally the housing embodiment, is preferably embodied identically to the electronic unit 24a of the pressure regulating module 24, to enable extensive standardization of the component groups used in the brake system.

Embodying the housings of the two electronic units 24a, 26 in particular creates the prerequisite for mounting the separate electronic unit 26—like the pressure regulating module 24—selectively outside the vehicle cab, directly on the vehicle frame. For this special application, the individual cable strands can then be united in round corded cables, so that as a result they can not only be better sealed off in the plug region, but it is also possible to reduce the number of individual cables otherwise necessary.

In addition to the electronic brake system described above, the brake system of the motor vehicle 10 of FIG. 1 also includes a pneumatic part with a brake value transducer 50, at which a supply pressure is available and which via its dual-circuit pneumatic system controls various pressure fluid lines, which are shown with a heavier line in FIG. 1 and in the other drawing figures in order to better distinguish them from the electric lines.

Figure 2:
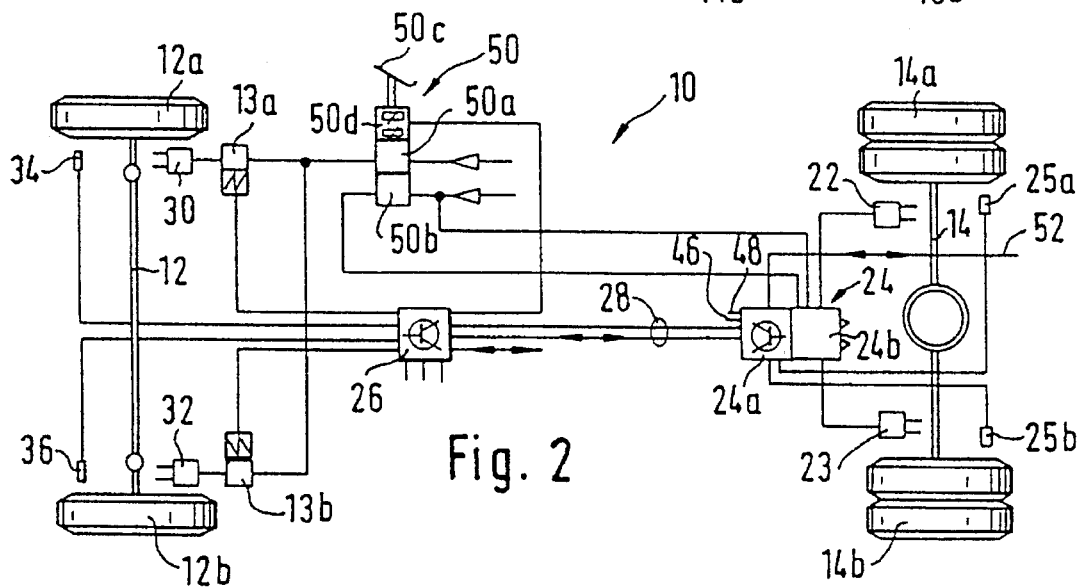
FIG. 2 is a schematic illustration of a further embodiment of an electronic brake system according to the invention for a 4×2 vehicle.

The vehicle schematically shown in FIG. 2 is a 4×2 vehicle with a nondriven front axle 12 and only one driven rear axle 14, whose driven wheels are again twin wheels 14a, 14b.

In FIG. 2, the electronic brake system again includes a pressure regulating module 24 with one electronic unit 24a and a separate electronic unit 26.

The brake value transducer 50 in this exemplary embodiment includes two pneumatic elements 50a, 50b, with the aid of which a pneumatic brake pressure (or optionally a hydraulic brake pressure in two separate brake circuits is mechanically controlled, in accordance with a position of the pedal 50c as specified by the driver. The brake value transducer 50 also includes an electrical or electronic transducer arrangement, for instance a potentiometer arrangement 50d, with whose aid electrical signals corresponding to the pedal position or to the controlled pressure can be generated for the electronic unit 24a of the pressure regulating module 24 and for the separate electronic unit 26. In the vehicle 10, which is a pulling or tractor vehicle, these electrical signals can be converted only via the two-channel pressure regulating module 24, or its electronic unit 24a, into corresponding pressure values, which assuming that the electronic brake is functional to block the control pressure, generated at the brake value transducer 50, for the downstream pneumatic or hydraulic units via an electrically triggerable switchover valve integrated into the pressure regulating module 24 or its valve unit 24b, and simultaneously deliver the substantially constant supply pressure, generated in the usual way, to these units.

By means of further magnet valves, integrated into the valve unit 24b of the two-channel pressure regulating module 24 and triggerable electrically, this supply pressure can now be metered precisely and can be varied, in accordance with the position of the pedal, as a brake pressure for the brake cylinders 22, 23 of the rear axle 14; by means of the electronic unit 24a, additional parameters, such as the weight of the load of the vehicle or the conditions of the brake linings, which are detected by separate sensors (not shown), can be evaluated in order to modify the brake pressure.

In the embodiment of FIG. 2 under consideration, the advantages of an electronic vehicle brake with the aid of the two-channel pressure regulating module 24 and resulting from its being mounted on the rear axle (or multiple rear axles) can be fully exploited, while at the same time if one or more components of the electronics should fail, the mechanical control of the vehicle brake is still fully effective in two separate brake circuits; depending on the type and extent of the malfunction of the electronic system and/or of the remaining vehicle electrical system, the ABS and/or ASR functions may still be partially or even completely operative.

In use with a trailer, the brake value specified by the driver at the brake value transducer is again mechanically transmitted as the control pressure, or if the electronic brake system is intact via a further interface 52, preferably directly from the two-channel pressure regulating module 24, and additionally also in the form of an electrical brake value signal, to the brake system of a trailer over the electrical and mechanical line connections provided for that purpose.

Signals that indicate the condition of the brake linings and signals derived therefrom by calculation, or signals such as temperature values for the applicable wheel brake that enable a conclusion to be drawn as to the condition of the brake linings are preferably delivered from sensors (not shown) assigned to the applicable vehicle wheels directly to the applicable electronic unit 24a or 26 and exchanged via the interfaces 28 provided for that purpose, so that each electronic unit 24a, 26 can separately ascertain suitable specifications for the operative brake pressure or for a suitable change in the brake force distribution and evaluate them for regulating the operating pressure.

Figure 3:
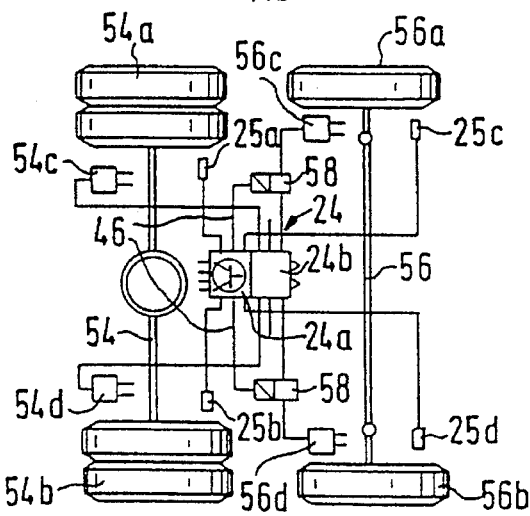
FIG. 3 is a schematic illustration of essential parts of a further advantageous embodiment of an electronic brake system according to the invention for a vehicle unit with one driven axle and one nondriven axle.

When there is joint regulation of the operating pressure or brake pressure for a vehicle part shown in FIG. 3, with two (twin) wheels 52a, 54b, 56a, 56b of a driven axle 54 and a nondriven axle 56, it is necessary for traction control (ASR) purposes for the brake cylinders 56c, 56d of the wheels 56a, 56b of the nondriven axle 56 to be blocked off from the brake pressure for the brake cylinders 54c, 54d of the wheels 54a, 54b of the driven axle 54.

In the preferred embodiment shown in FIG. 3, this can be done with the aid of two simple, electrically triggerable 2/2-way valves 58, which in the exemplary embodiment are each connected between the applicable brake cylinder 56c, 56d and the applicable operating connection of the valve unit 24b of the two-channel pressure regulating module 24.

In the exemplary embodiments described, special additional functions, such as retarder control (FIGS. 1–3) or the generation of an electronic blocking signal (such as in FIG. 3), which in the case of joint control of a driven axle 54 with a nondriven axle 56 or "lift axle" blocks its brake cylinders 56c, 56d relative to the brake pressure in the ASR mode, are preferably controlled directly by the two-channel pressure regulating module 24 via additional connections 46, 48.

Likewise in the case of joint wheel control on one side by two driven axles 14, 16—as in the case of the 6×4 vehicle of FIG. 1—a marked improvement in function in both the ABS and ASR modes can be attained by means of interposed 2/2-way valves 58 for one axle 16 of the axles or for its associated brake cylinders 20, 23. As needed, the brake or operating pressure for the joint wheel-brake pressure control of a given side can be built up and reduced with a delay by clocking of the interposed 2/2-way valves 58, so that in principle different brake pressures can be set for all four brake cylinders 18, 20, 22, 23 or wheels 14a, 14b, 16a, 16b with the aid of the pressure regulating module 24 which is embodied with only two channels and with the aid of the two 2/2-way valves 58, which in this case are connected downstream. The electrical triggering of the 2/2-way valves 58 is preferably done directly from a corresponding output of the two-channel pressure regulating module 24.

It is clear from the above description that with the electronic brake system according to the invention a number of advantages can be attained. For instance, the use of an integrated pressure regulating module makes it possible to achieve ABS and ASR functions and to expand the brake system in the direction of a fully electronic brake system. Moreover, the electronic unit split into two units is suitable for either a separate arrangement or may include further actuators to thereby provide a coupled arrangement. The electronic units and further electrical and electronic units can be connected to power arbitrarily via interfaces, resulting in minimum expenditure for cables. Moreover, one or both electronic units may be mounted outside the vehicle cab, on the vehicle brake in the immediate vicinity of the brake cylinders. In addition, as described in conjunction with the exemplary embodiments, separate conventional pressure control valves are needed at most to achieve ABS functions, while on the other hand because simple conventional 2/2-way valves are used, an additional pressure modulation at the brake cylinders of the associated axle is also possible. Despite these many possibilities, the brake system according to the invention can be achieved at favorable cost because of its compact design and because the control devices for the two electronic units are virtually identical. The "component concept" employed here can also be employed in dual fashion, namely for a conventional vehicle brake with an ABS and/or ASR function, and/or for an electronic vehicle brake. Because the electronic brake devices are dually split up into one part with mechanically controlled braking and one part with electronically controlled braking, there are also considerable advantages in terms of safety and serviceability, and in addition, despite the partially mechanically controlled braking for individual axles, the functional advantages of a fully electronic brake system are essentially achievable in full.

The electronic brake system according to the invention is especially well suited for tandem-type tractor vehicles, which especially in the US are embodied in standard fashion as 6x4 vehicles and which because of legal requirements (FMVSS 121) generally require relay valves on the rear axles. (In a conventional ABS system, two additional ABS pressure control valves are then also necessary, as well as two further magnet valves and alternating valves for the ASR function. This means considerable expenditure for installation and cables, since each component has to be secured individually and wired electrically individually.)

When the brake system according to the invention is used, instead of the relay valves used until now a two-channel pressure regulating module is now used; all that is needed besides the four cables for the rpm sensors is as a rule one heavy duty round corded cable for electrically connecting the module; the round corded cable thus includes the interface connections, the voltage supply connections, and optionally one or more signal lines as well. The separate electronic unit is then electrically connected in a corresponding way, namely using an identical heavy duty round corded cable and two or four rpm sensor cables and two cables for the separate pressure control valves.

It is also clear from the above description that in a dual electronic brake system according to the invention, for instance as shown in FIG. 2, decisive advantages are attained in terms of great safety and minimum expense, especially because braking takes place only partially electronically, and this is done only wherever functional advantages are attainable, namely at the rear axles, because only those axles are so far away from the service brake valve or brake signal transducer that a markedly improved time performance is attainable by means of an electronically controlled braking. Control functions that are dependent on the load state of the vehicle and that are better converted electronically are also usually necessary only on the more heavily load-dependent rear axles. Even functions expected in the future, such as taking lining wear into account or controlling coupling force, are basically significant only at the rear axles in the case of electronic intervention, and can already be achieved there quite well with conventional means.

The aforementioned functions can be still further optimized by including the conventional pressure control valves on the front axles in the electronic brake control. By way of example, this can be done so that in the release of the brakes, the electrical braking value specified via the brake value transducer is converted with the aid of the separate electronic unit in such a way that the brake pressure decrease at the front axles takes place not (mechanically) via the service brake valve but rather by electrical triggering, and specifically, in the case of an intentionally slow pressure decrease, by a clocked triggering of the magnet valve, among the conventional pressure control valves, that determine the pressure reducing and holding functions.

In the case of lining wear control as well, it is possible, for instance by means of a brief pressure reduction cycle and an ensuing holding cycle, for the mechanically built-up brake pressure at the front side to be reduced electronically to a lower brake pressure level, so that if necessary because of the condition of the brake linings, the rear axles can be braked proportionately more strongly as a result, and in the process the intended setting of the brake pressures and varying of the brake force distribution involved can be done either axle by axle or wheel by wheel.

In a feature of an electronic brake system according to the invention, it is also conceivable, however, to vary the conversion factor for the electrical brake value signal generated by the driver at the brake value transducer as a function of load criteria and/or brake lining criteria or other functional criteria; the brake force distribution may be varied axle by axle or wheel by wheel, either directly with the aid of the two-channel pressure regulating module, or as explained above optionally and in addition via the conventional pressure control valve assembly.

In the embodiment shown in FIG. 3 of an electronic brake system according to the invention, the brake pressure can also be adapted in a simple manner for a "carried-along axle" in the ABS and ASR modes, and in the 6x4 arrangement as well, both functions can be improved markedly by means of the simple, electrically triggerable 2/2-way valves.

Especially in the arrangements of FIGS. 1 and 2, it is also conceivable to use electronic wheel rotation transducers, rather than the previously conventional inductive rpm sensors. Since electronic rpm sensors of this kind as a rule require a supply voltage, it is advantageous to keep the line connection for the feed voltage and the sensor signals between the control unit and the rpm transducer as short as possible. This requirement can likewise advantageously be met by means of the axle-by-axle splitting up of the brake system into two electronic units.

The general advantage of electronic transducers is that usable rpm signals down to a zero rpm can be obtained, so that startup processes above all can be improved markedly while utilizing the ASR function; it may already be sufficient in this respect to use corresponding transducers only on the driven axles.

It is also conceivable to split up the compact arrangement of the two-channel pressure regulating module into one-channel pressure modulators. One advantage in that case would be that already existing conventional valves could be connected not only to the front axle but to the rear axle. The special advantages of the compact design of the two-channel pressure regulating module preferably used in accordance with the invention are not attainable then, however.

Overall, it is clear from the above description that by combining all the actuators required for an electronic brake system into a compact unit in the form of a two-channel pressure regulating module, which moreover can be used in the same embodiment for a conventional brake system with a traction control function as well, and by reducing the number of control units to two virtually identical control units (where previously, up to six individual control units were required for a 6×2 vehicle, for example, and all of them had to be supplied with voltage and interlinked with one another via interfaces) according to the invention an electronic brake system can be achieved substantially at the price of a conventional brake system with ABS and ASR functions, while exploiting the advantages of mass production.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. An electronic brake system, for road vehicles, having an electronic system serving to trigger brake pressure modulators and subdivided into units, each said unit containing at least one microcomputer, the electronic system being split into first and second electronic units (24a, 26); said first electronic unit (24a) is formed by a two-channel pressure regulating module (24); said second electronic unit (26) is assigned to up to two separate pressure control valves (13a, 13b); said first and second electronic units (24a, 26) further include electronic components in addition to the at least one microcomputer, said electronic components being disposed so that each of said first and second electronic unit (24a, 26) processes from one up to four wheel speed data and regulates from one up to two brake pressures individually, said first electronic unit (24a) is assigned to at least one driven rear axle and is part of the pressure control module (24) which feeds brake pressure into the brakes of the rear wheels to control the driven axles and for brake modulation, and the second electronic unit (26) controls the brake pressure fed by a brake valve transducer (50) to control the brakes of the wheels on the nondriven axle; and further each said first and second electronic unit (24a, 26) has at least one interface (28), whereby information and signals are exchanged between the first and second electronic units (24a, 26) and exchanged with further electronic and electrical systems.

2. A brake system as defined by claim 1, wherein each of said first and second electronic units (24a, 26) are embodied such that by preparation and mutual exchange of wheel speed information directly assigned to said first and second electronic units, reference speed signals and control signals, are evaluated by said first and second electronic units to achieve ABS and ASR control functions.

3. A brake system as defined by claim 1, wherein each of said first and second electronic units (24a, 26) are supplied with signal information from a brake value transducer (50), said signal information is processed in said first and second electronic units and exchanged between said first and second electronic units, and further wherein said signal information is converted under electronic regulation via the two-channel pressure regulating module (24) into a corresponding brake pressure.

4. A brake system as defined by claim 3, wherein each of said first and second electronic units (24a, 26) are also adapted to provide further signal information about a load state and a condition of the brake linings and for trailer operation, about operative coupling forces, and other criteria affecting the brake function is processed, and is exchanged with the respectively said other electronic unit; and further that the brake pressures, regulated with the aid of the two-channel pressure regulating module (24) is modified as a function of this signal information.

5. A brake system as defined by claim 1, wherein said two electronic units (24a, 26) are arranged so that conventional pressure control valves (13a, 13b) are triggerable by at least one of these said units in order to vary the brake force distribution.

6. A brake system as defined by claim 5, wherein said two electronic units (24a, 26) are arranged so that the brake pressure reduction of mechanically braked front wheels (12a, 12b) is also controllable directly via the conventional pressure control valve (13a, 13b).

7. A brake system as defined by claim 1, wherein the electrical supply and signal lines to the first and second electronic units (24a, 26) are unitized into heavy duty cables.

8. A brake system as defined by claim 1, wherein at least one of the first and second electronic units (24a, 26) is embodied mechanically and electrically such that it is mounted on the vehicle frame or in an unprotected location on a vehicle equipped with the brake system.

9. A brake system as defined by claim 2, wherein traction control functions attainable by controlling brake pressure is performed directly by the two-channel pressure regulating module (24).

10. A brake system as defined by claim 1, wherein electrically triggerable 2/2-way valves (58) associated with the brake cylinders (20, 23) of a second driven axle (16) are connected downstream of the two-channel pressure regulating module (24), and by means of said valves the brake pressure, regulated jointly at first and second driven axles (14, 16) from one side to the next by the pressure regulating module (24), can be set differently upon pressure buildup and pressure reduction at said second driven axle (16).

* * * * *